Jan. 12, 1971  D. A. KELLY  3,553,963

CLOSED BI-CYCLE TANGENTIAL FLOW TURBINE

Filed July 28, 1969  3 Sheets-Sheet 1

INVENTOR.
Donald A. Kelly

Jan. 12, 1971  D. A. KELLY  3,553,963

CLOSED BI-CYCLE TANGENTIAL FLOW TURBINE

Filed July 28, 1969  3 Sheets-Sheet 3

INVENTOR.
Donald A. Kelly

United States Patent Office 3,553,963
Patented Jan. 12, 1971

3,553,963
CLOSED BI-CYCLE TANGENTIAL FLOW TURBINE
Donald A. Kelly, 58—06 69th Place,
Maspeth, New York, N.Y. 11378
Filed July 28, 1969, Ser. No. 845,321
Int. Cl. F03g 7/06; F25b 9/00
U.S. Cl. 60—24                                    7 Claims

ABSTRACT OF THE DISCLOSURE

The closed bi-cycle tangential flow turbine is envisioned as a low-cost, low air polluting power source for many vehicular applications. The closed bi-cycle turbine is a Brayton cycle machine in which a fixed volume of gas is cycled twice through an axial flow loop that enters and leaves the operating bores tangentially, or nearly so. The axial coupling of the operating stages and gas loop allows direct connection of them with a single shaft seal at the output shaft.

---

The invention describes a modified Brayton closed cycle tangential flow turbine in which the compressor and power stages are conventionally in-line and directly connected by a single shaft.

The compressor and power bores are connected by a large number of tiny hot and cold transfer holes or ducts which enter and leave them tangentially so that a continuous axial gas loop is established.

The purpose of the large number of tiny hot and cold transfer holes or ducts is to facilitate rapid heat transfer and thereby overcome the usual transfer problem encountered in closed cycle turbines.

The closed bi-cycle turbine stages are arranged in modular form so that the transfer bores can pass through the alternate thermal sections conveniently, without the necessity of external ducting and multiple connections.

The operating stages are nearly equal in volume with the hot and cold sections insulated from each other and arranged to establish optimum thermal efficiency.

The purpose of double or bi-cycling the gas in the closed cycle turbine is to partially cancel the negative torque required to compress the cold gas in the compressor stage, and by so doing, reduce the total torque loss within the turbine system. The compressor stage consists of a Ramelli type sliding vane and eccentric rotor which provides a compression ratio of about 7:1, for the compression of the cold gas.

The sliding vane and rotor compress the upward flowing cold gas while the partially reheated gas from the cold side of the power stage provides the positive torque to balance out the required compression torque.

The bi-cycling of the working gas is accomplished by the alternate placement of the thermal sections so that the circulating gas is twice alternately heated and cooled as it flows through the closed loop. The double cycling, in effect induces a positive turning moment in both stages which tend to offset the normal torque losses within both working stages.

The tangential flow turbine is essentially a water-wheel type which facilitates the forming of the Brayton cycle flow loop in a compact, modular form which will serve in various vehicular applications. Only low cost operating components are utilized for the turbine, since it does not depend on expensive axial type acrodynamic rotor blades.

The compressor sliding vane is free floating within the compressor bore and is not sealed at the ends and along the side but revolves at close clearance within the bore and side plates. The vane is supported by eight ball bearings within the rotor to minimize friction as the vane slides back and forth within the rotor slot.

The compressor vane is provided with multiple tiny air cushion holes which are located in the vane ends and run diagonally to one face of the vane.

The air cushion holes serve to keep the vane ends from contacting the compressor bore walls by creating an air cushion between the vane ends and the bore.

The vanes of the power section are radially guided by side ball bearings which revolve in matching circular grooves within the side plates. The power vanes rotate at close clearance to the bore and side plates, so that effective expansive force is not lost through excessive clearance.

The power vanes may also be provided with air cushion holes similar to that of the compressor vane so that an air cushion is created between each vane end and the power bore. The air cushion formed would tend to relieve the radial load imposed on the side ball bearings, as the vanes rotate.

The thermal sections are completely insulated from each other by high temperature gaskets, so that a minimum of thermal loss occurs between them.

The single drive shaft connects both rotors in their stages and is pressure sealed by a connecting pressure-tight tube. The hot and cold transfer sections consist of laminated plates and divider strips so that multiple small cross-section gas ducts are formed, which are pressure sealed from each other. The divider strips may be zig-zagged to aid in heat transfer, but must not impede the gas flow.

The laminated plates are notched into each of the stage rotor blocks so that a pressure-tight seal is assured.

The connecting hot and cold bores from the two large operating bores terminate at the block surface between the laminated plates and in between the divider strips, to form the complete gas flow loop. A sealing compound may be required to achieve a reliable, pressure-tight seal at all the laminated surfaces.

The assembled stage blocks and hot/cold transfer sections may be reinforced with structural members so that the sections do not take the stress induced by the shaft torque.

The compressor vane may be provided with zig-zag regeneration bores and filament as on other previously disclosed cycle engines in this class. This feature will be optional in this engine design and will depend on the thermal gradient required within the compressor stage.

The tangential flow turbine, as a closed cycle machine, must be provided with high temperature dry film lubricant on contacting surfaces, and one low friction shaft seal to minimize rotational drag.

The heating of the hot section is accomplished by multiple burners placed uniformly under, around, and on top of the hot section lamination assembly.

The cooling of the cold section is accomplished by a circulating liquid cooling arrangement. The cooling coils uniformly contact the outer surfaces of the cold section lamination assemblies.

A pressurization system must be provided for the closed cycle turbine which would consist of an external gas pump and connecting pressure lines. An automatic pressure regulating unit would maintain the required pressure level within the turbine.

It is an object of the invention to provide a closed cycle turbine which operates with a minimum of air-polluting emissions.

It is an object of the invention to achieve a closed cycle turbine which is low in cost, and with a minimum of high cost purchased components.

It is a final object of the invention to provide a closed cycle turbine which has a minimum number of operating parts and requires a minimum amount of maintenance.

It should be understood that variations may be made in the detail design without departing from the spirit and scope of the invention.

Referring to the drawings.

Figure 1:
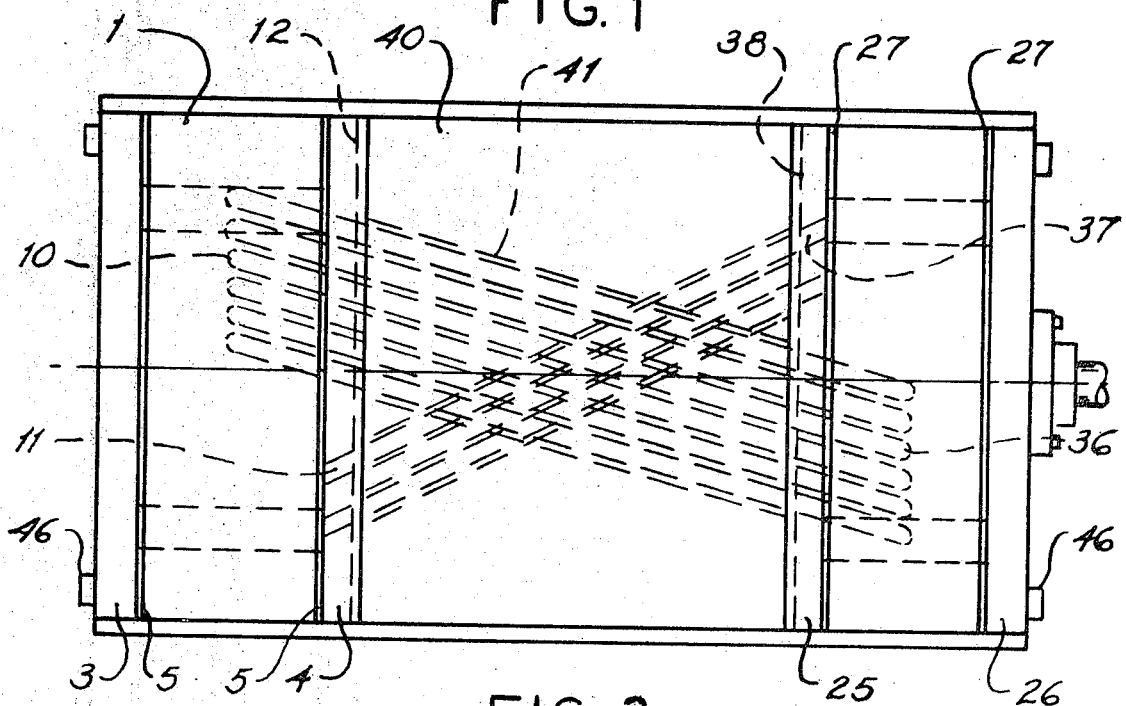
FIG. 1 is a plan view of the closed bi-cycle turbine.
Figure 2:
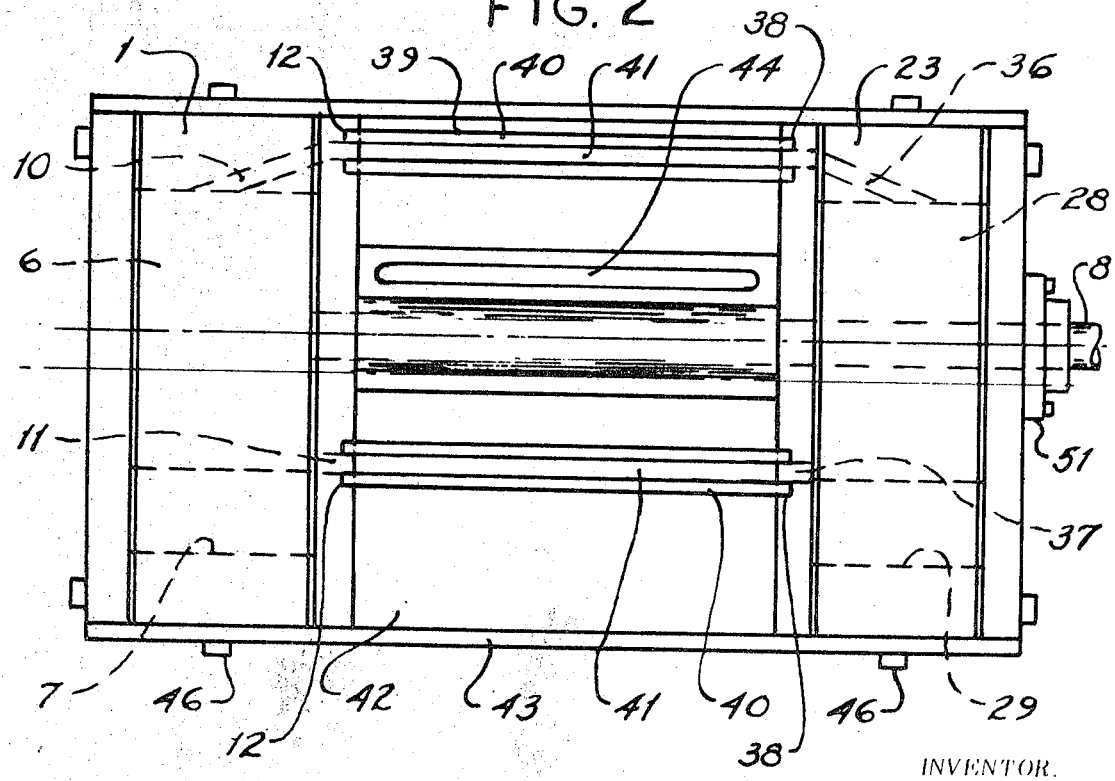
FIG. 2 is an elevation view of the closed bi-cycle turbine.
Figure 3:
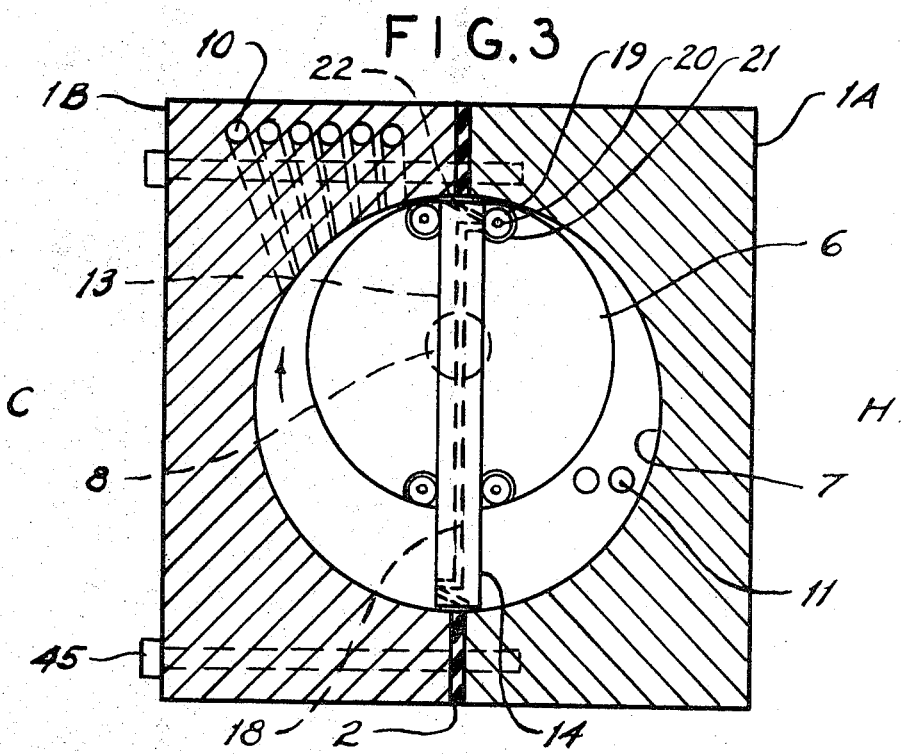
FIG. 3 is a cross-section view of the compressor stage.
Figure 4:
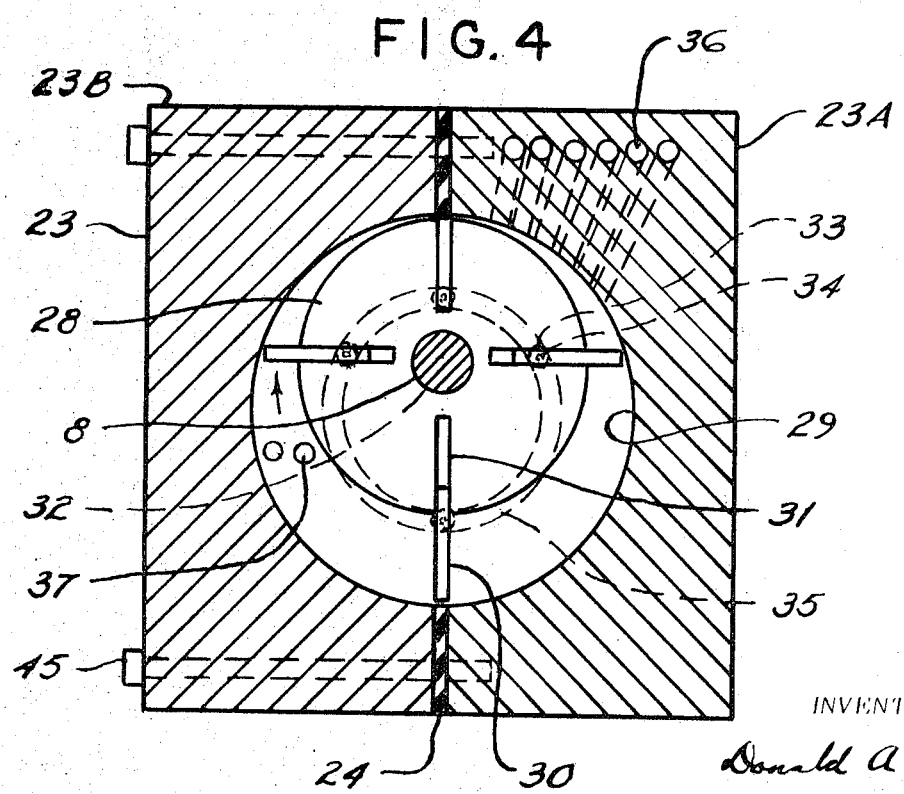
FIG. 4 is a cross-section view of the power stage.
Figure 5:
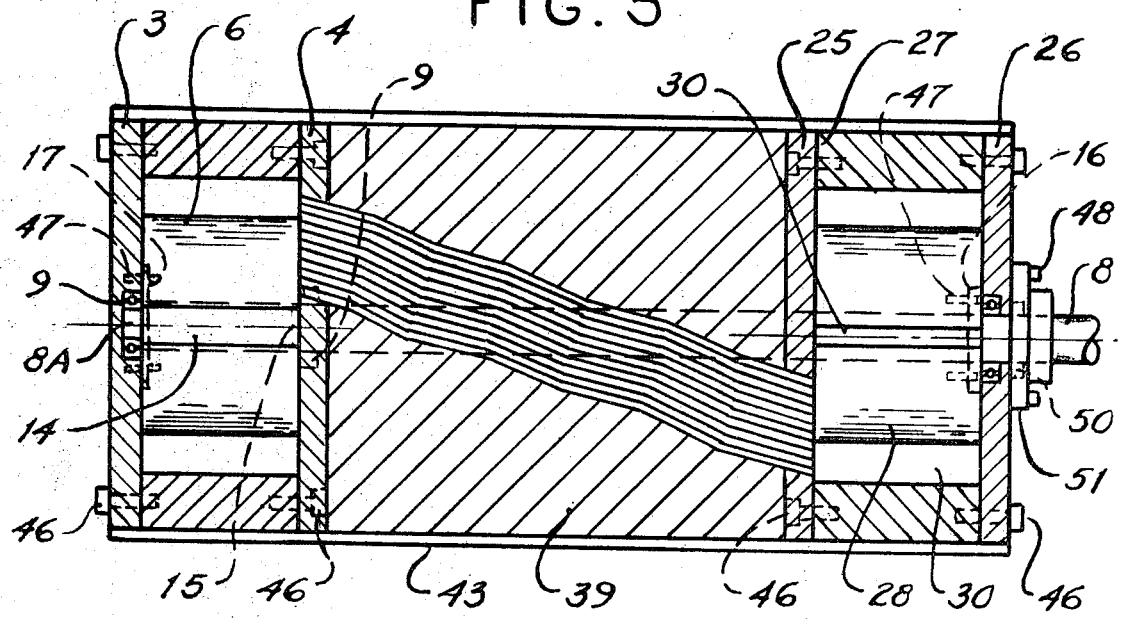
FIG. 5 is a cross-section plan view of the hot transfer section.
Figure 6:
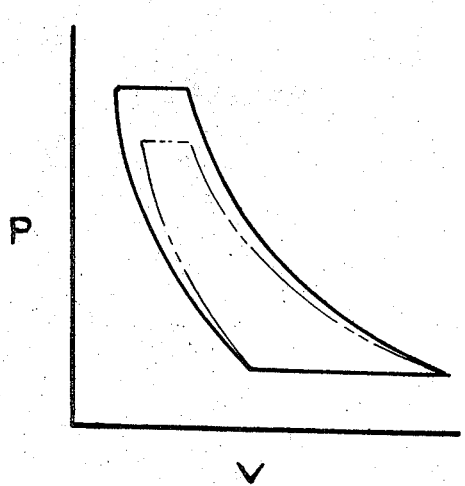
FIG. 6 is a schematic diagram of the closed bi-cycle turbine.
Figure 7:
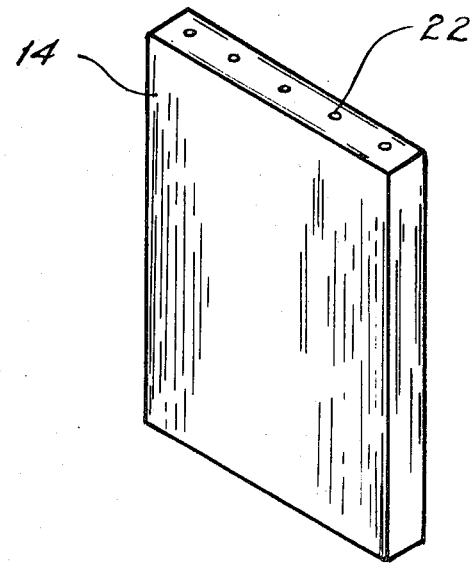
FIG. 7 is a pictorial view of the sliding compressor.
Figure 8:
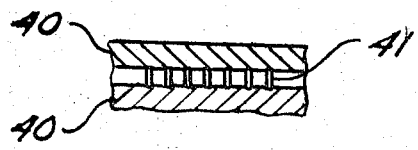
FIG. 8 is a cross-section thru the tiny hot gas ducts.

Referring to the drawings in detail:

The compressor block 1 is divided into two sections; one hot section 1A and a cold secton 1B, which are equal in shape and volume. The sections are insulated from each other by the insulating gaskets 2, and secured together with the bolts 45. The end plates 3 and 4 are secured to the compressor block 1, by the screws 46 and insulated from it by the insulating gaskets 5.

The compressor rotor 6 is tangent to and revolves in the compressor bore 7, which is equally divided by the hot section 1A and cold section 1B. The compressor rotor 6 is supported by the shafts 8 and 8A, and the two bearings 9, fitted into the end plates 3 and 4.

Diagonal hot transfer bores 10, and cold transfer bores 11 connect the compressor bore 7 with the end face of the compressor block 1. Uniform notches 12 are located on the end face of the compressor block 1, into which the hot and cold transfer sections closely fit.

The compressor rotor 6 has a diametrical slot 13 through its center which provides clearance for the radial displacement of the compressor vane 14. The slot 13 nearly divides the rotor 6 in half except for two tie connections 15 at both rotor ends.

The shaft 8 has a base flange 16 which is secured to the compressor rotor 6 ends, by the screws 47. The shaft 8A also has a base flange 17 which is secured to the opposite end of the rotor 6 by the screws 47.

The compressor vane 14 is provided with internal regenerator bores 18 which are zig-zagged to provide the necessary flow path distance. The compressor vane 14 may be split down the width in order to facilitate the machining of the regenerator bores 18.

The ball bearings 19 are recessed into the compressor rotor 6, and supported by the pins 20 within the recesses 21.

The ball bearings 19 closely guide the linear motion of the compressor vane 14, and equally protrude into the diametrical slot 13, so that the vane 14 does not touch the slot side walls.

The compressor vane 14 is provided with multiple tiny air cushion holes 22 which form an air cushion for the vane's rotation.

The power block 23 is axially in-line with the compressor block 1 and at a distance of about four times the power block width. The power block 23 is divided into two sections, one hot section 23A and a cold section 23B, which are equal in shape and volume. The sections are insulated from each other by the insulating gaskets 24, and secured together with the bolts 45. The end plates 25 and 26 are secured to the power block 23, by the screws 46 and insulated from it by the insulating gaskets 27.

Diagonal hot transfer bores 36 and cold transfer bores 37 connect the power bore 29 with the end face of the power block 23. Uniform notches 38 are located on the end face of the power block 23, into which the hot and cold transfer sections closely fit.

The power rotor 28 is tangent to and revolves in the power bore 29 which is equally divided by the hot section 23A and cold section 23B. The power rotor 28 is supported by the shaft 8 which revolves in the bearings 9 fitted into the power block 23. An external shaft pressure seal 50 is provided where the shaft 8 protrudes from the power block 23. The shaft seal 50 is supported by the flange 51 and secured with the screws 48.

The power vanes 30 are closely fitted into the rotor slots 31 and are free to move radially within these slots. The power rotor 28 has a center bore 32 into which the shaft 8 closely fits.

The power vanes 30 are guided in their radial displacement by two ball bearings 33 fixed at the vane lower sides and supported by the pins 34. The ball bearing 33 revolve freely in the grooves 35 located on the inside faces of the end plates 25 and 26. The grooves 35 are concentric to the power bore 29 and guide the power vanes 30 at close clearance to the power bore 29 to insure maximum effectiveness of the expansion force.

The hot transfer section 39 is made up of multiple plates 40 which are separated by the uniformly placed divider strips 41, so that an essentially laminated structure results. The divider strips 41 are placed so that multiple small cross-section gas ducts are formed. The divider strips 41 may be zig-zagged to aid in heat transfer, but the offsets must be kept shallow.

The multiple plates 40 are fitted into the multiple notches 12 in the compression block 1, and the multiple notches 38, in the power block 23.

The cold transfer section 42 is made up of the multiple plates 40 and divider strips 41, in a similar manner to the hot transfer section 39. These multiple plates 40 are also fitted into the multiple notches 12 and 38 of both operating blocks 1 and 23. A sealing compound may be used to provide a pressure-tight seal at all the laminated surfaces.

The assembled stage blocks 1 and 23 and the hot and cold transfer sections 39 and 42 respectively are reinforced by the structural member 43 which is secured to the compressor block 1 and the power block 23 with the screws 46.

The multiple burners 44 are uniformly placed under the hot section 39 so that completely even heating is provided over the heating surface.

A series of liquid cooling coils are uniformly placed around and in contact with the cold section 42 so that uniform cooling is provided for the cold transfer section.

A pressurization system is proivded for the turbine system, but is not shown for the sake of specification simplicity.

What is claimed is:

1. A closed cycle tangential flow turbine comprising a compressor block and a power block connected by two thermal transfer sections, a compressor bore centrally disposed within the said compressor block, a power bore centrally disposed within the power block coaxial with the said compressor bore, a compresor rotor tangent at one point within the said compressor bore and containing a wide diametrical slot, a wide compressor vane freely moving within the said wide diametrical slot, one long and one short flanged shaft disposed at each end of the said compressor rotor and supported by bearings eccentrically located within the said compressor bore, a power rotor tangent at one point within the said power bore and containing multiple radial slots, a through center bore disposed within the said power rotor and secured near one end of the said long shaft, multiple power vanes in sliding association with the said radial slots of the said power rotor, two sets of end plates and gaskets secured to and sealing the said compressor block and power block, sealing means disposed on one of the said end plates where the said long shaft protrudes from the said power block, a pressure sealing tube disposed over the said long shaft secured between the said compressor block and said power block.

2. A closed cycle turbine according to claim 1 wherein the said two thermal sections are comprised of alternate flat plates and uniformly disposed divider strips between the said flat plates to form a laminated structure containing multiple gas flow ducts, said flat plates are notched into the said compressor block and said power blocks, said divider strips are provided with uniform wave-like protrusions on both sides, diagonally disposed transfer bores connecting the said compressor bore and said power bore with the said multiple gas flow ducts so that a continuous gas flow circuit is established.

3. The closed cycle turbine according to claim 1 wherein the said wide compressor vane is provided with tiny air cushion holes diagonally disposed between the ends and opposite faces of the said wide compressor vane, the said compressor rotor is fitted with eight anti-friction bearings in rolling association with the said wide compressor vane, the said multiple power vanes are provided with tiny air cushion holes diagonally disposed between the ends and opposite faces of the said power vanes.

4. The closed cycle turbine according to claim 1, in which the said multiple power vanes are provided with two ball bearings at the lower ends in rolling association with circular grooves concentrically disposed on the inside faces of one said set of two end plates.

5. A closed cycle turbine according to claim 1, wherein the said wide compressor vane is provided with multiple non-linear regenerator bores uniformly disposed within said compressor vane, the length of said multiple non-linear regenerator bores are equal in length to one-half circumference of the revolving arc described by the said wide compressor vane length, multiple parts corresponding to and intersecting the said regenerator bores uniformly disposed on the face near each end of the said wide compressor vane.

6. A closed cycle turbine according to claim 1, in which one of the said thermal sections is provided with multiple low-emission burners uniformly disposed along the length of the said thermal section, the other thermal section is provided with a liquid coolant uniformly disposed along the length and in contact with the said other thermal section.

7. A closed cycle turbine according to claim 1, wherein the said compressor block is divided into two equal parts with thermal insulation placed between the two halves, fastening means to join the two said equal parts, the said power block is divided into two equal parts with thermal insulation placed between the two halves, fastening means to join the two said equal parts.

References Cited

UNITED STATES PATENTS

| | | | |
|---|---|---|---|
| 2,044,330 | 6/1936 | Richter | 62—6X |
| 3,370,418 | 2/1968 | Kelly | 60—24 |
| 3,426,525 | 2/1969 | Rubin | 60—24 |
| 3,487,424 | 12/1969 | Leger | 62—6 |
| 3,492,818 | 2/1970 | Kelly | 60—24 |

FOREIGN PATENTS

| | | | |
|---|---|---|---|
| 962,996 | 12/1949 | France | 60—24 |

MARTIN P. SCHWADRON, Primary Examiner

R. BUNEVICH, Assistant Examiner

U.S. Cl. X.R.

62—6